Nov. 6, 1962　　　C. R. TAYLOR ET AL　　　3,062,135
PHOTOGRAPHIC COPYING APPARATUS STRIPPING MECHANISM
Filed June 13, 1960　　　2 Sheets-Sheet 1

CLARENCE R. TAYLOR
WILLIAM C. WILSON
INVENTORS

BY
ATTORNEYS

Nov. 6, 1962 C. R. TAYLOR ET AL 3,062,135
PHOTOGRAPHIC COPYING APPARATUS STRIPPING MECHANISM
Filed June 13, 1960 2 Sheets-Sheet 2

CLARENCE R. TAYLOR
WILLIAM C. WILSON
INVENTORS

BY *R. Frank Smith*

*Steve W. Grenbaum*
ATTORNEYS

United States Patent Office 3,062,135
Patented Nov. 6, 1962

3,062,135
PHOTOGRAPHIC COPYING APPARATUS
STRIPPING MECHANISM
Clarence R. Taylor and William C. Wilson, Rochester, N.Y., assignors to Eastman Kodak Company, Rochester, N.Y., a corporation of New Jersey
Filed June 13, 1960, Ser. No. 35,500
18 Claims. (Cl. 101—232)

This invention relates generally to document copying devices, and more specifically to an improved copy sheet stripping mechanism for a photographic copying device.

In all document copying devices that applicants are aware of the type in which a copy sheet is placed into intimate contact with a matrix for transferring an image from the matrix onto the copy sheet the stripping mechanism is fixed with respect to the matrix transport device for stripping each document or copy sheet from the matrix after it has been in contact therewith for a predetermined time. The disadvantage of an apparatus of this type is that although the image on the first few copies may be good, as the number of copies increases, the density of the image on the copy sheet decreases until the copies are no longer satisfactory. Applicants' present invention is specifically designed to compensate for the normal tendency of the density of the image on the copy sheet to reduce or fall off by permitting the copy sheet to stay in contact with the matrix for longer periods of time, rather than a predetermined time as the number of copies made from a given matrix increases, thereby making it possible to produce a greater number of satisfactory copies from one matrix.

Therefore, one of the primary objects of this invention is to provide an improved adjustable copy sheet stripping mechanism for a copying apparatus that varies the point at which the copy sheet is stripped from the matrix thereby compensating for the tendency of the copy sheet image density to reduce or fall off.

Another object of this invention is to provide an improved copying apparatus having mechanism for adjustably increasing the contact time of the copy sheet with the matrix after a specified number of copy sheets have been produced therefrom, thereby compensating for normal fall off in density of the images on the copy sheet.

Still another object of this invention is to provide an improved manually adjustable stripping mechanism for a copying apparatus that is of simple design and construction, thoroughly reliable and efficient in operation, and economical to manufacture.

Objects and advantages other than those set forth above will be apparent from the following description when read in connection with the accompanying drawings, in which.

Figure 1:
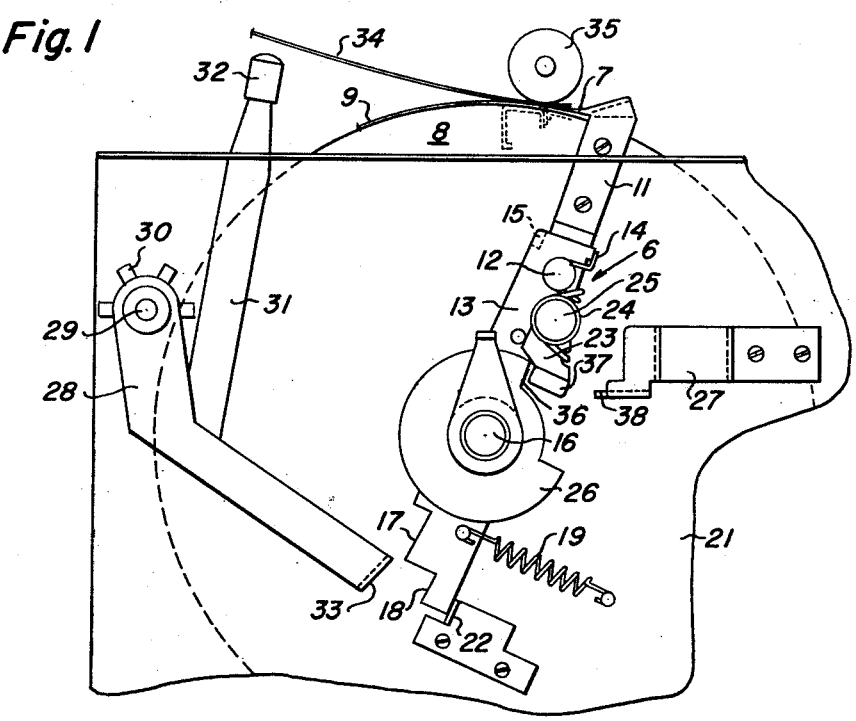
FIG. 1 is a segmental side elevation view of a copying apparatus showing the drum on which the matrix is mounted and a preferred embodiment of the stripping mechanism associated therewith.

The improved copy sheet stripping mechanism of this invention is particularly adapted to a photographic copying apparatus of the type having a tray provided with a processing solution, a matrix pick-up mechanism including a drum for removing the matrix from the solution and positioning it upon the drum, the timing mechanism for automatically timing the development period of the matrix within the solution, and a drum stripping mechanism actuated by a copy sheet as it is fed into the machine for simultaneously rotating the drum and urging the copy sheet into contact with the matrix. A photographic copying apparatus of this type is described in detail in applicants' pending U.S. patent application Ser. No. 816,639, filed May 28, 1959, and this application is directed to the specific stripping mechanism incorporated therein.

As shown in the drawings, the stripping mechanism 6 comprises a stripper blade 7 of any suitable type mounted adjacent the periphery of a matrix carrying drum 8 and urged by a spring, not shown, into engagement with drum 8 to strip a copy sheet off of a matrix 9 upon rotation of drum 8. The stripper blade 7 is parallel to the drum axis and extends completely across the length of drum 8 and has depending end portions 11, only one of which is shown, extending over the ends of drum 8. Each end portion 11 is pivotally secured at 12 to an arm 13 and urged by a spring 14 into engagement with a lug 15 formed by arm 13. Spring 14 serves as a safety device permitting blade 7 and portion 11 to pivot away from drum 8 in case a build up occurs on drum 8 that exceeds the normal clearance between blade 7 and drum 8. Each arm 13 has an opening therein through which drum spindle 16 extends for rotatably supporting arms 13 and stripper blade 7 as a unit. The end of at least one of the arms 13 is stepped to provide a plurality of shoulders or abutments 17, 18, only two of which are shown, for a purpose to be explained hereinafter. A spring 19 is interposed between arm 13 and a drum spindle support bracket 21 for urging arms 13 and stripper blade 7 in a counter clockwise direction into engagement with a stop member 22 mounted on bracket 21.

The arm 13 has a pivotal pawl or cam follower 23 which is normally urged in a clockwise direction by a spring 24 encircling a stud 25 about which pawl 23 is pivoted. A notched cam disk 26 is secured to drum spindle 16, and a lever 27 having a latch finger 38 at one end thereof is secured to bracket 21. A stop lever 28 is pivoted about a bracket stud 29, and has an arm 31 secured thereto provided with a handle 32 for adjustably moving stop lever 28 in a position causing its ends 33 to engage one of the shoulders 17, 18 formed by arm 13. Any suitable detent means or the like such as spring washer 30 frictionally bearing on bracket 21 may be provided for releasably holding stop lever 28 and arm 31 in a selected position.

Figure 2:
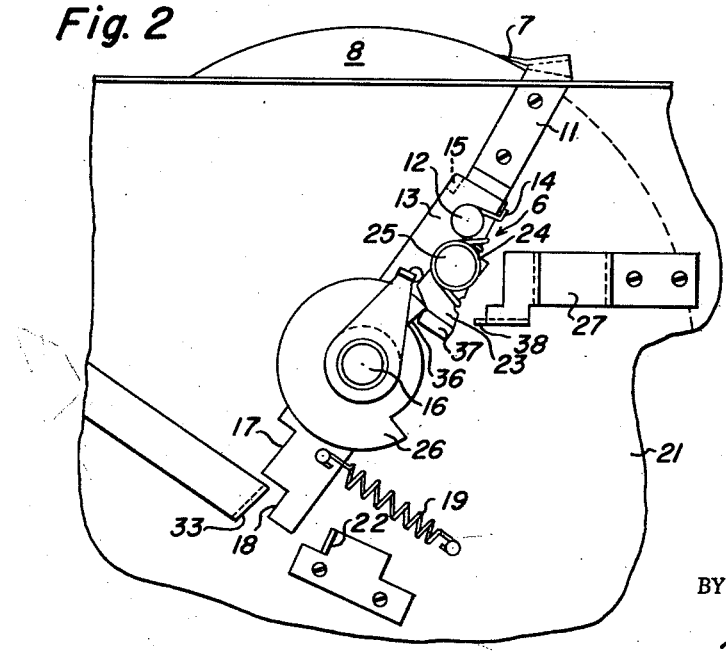
FIG. 2 is a view similar to FIG. 1, showing how the stripping mechanism is moved in a clockwise direction by the drum.
Figure 3:
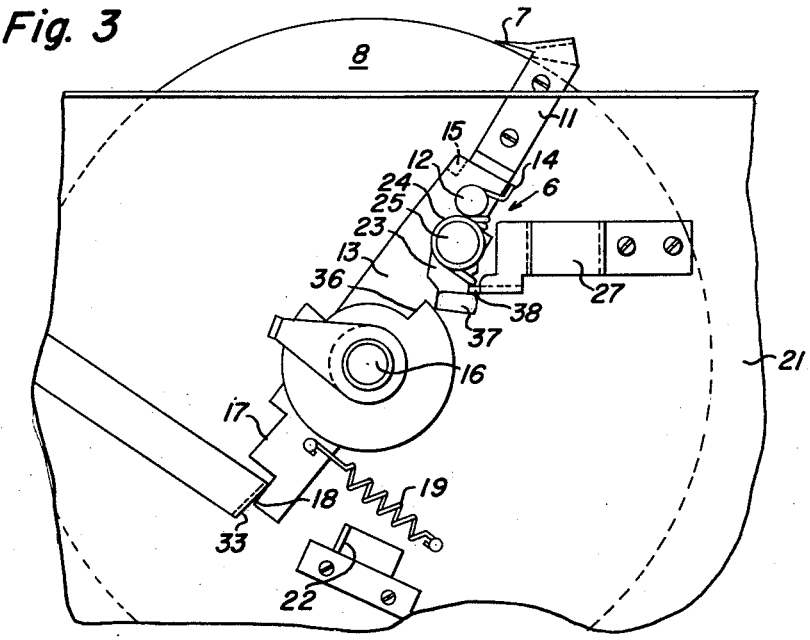
FIG. 3 is a view similar to FIG. 1, showing the stripping mechanism being releasably held in one position for stripping a copy sheet off of the matrix.

In the operation of this invention, the copying apparatus and stripping mechanism 6 is normally in the position shown in FIG. 1. Let us assume that a matrix 9 has been properly positioned on the periphery of drum 8. Let us further assume that a copy sheet 34 is advanced by some suitable means to a copying position in registration with matrix 9 with the leading edge thereof extending onto blade 7, and copy sheet 34 urged into intimate contact with matrix 9 by a pressure roller 35 as seen in FIG. 1. Upon rotation of drum 9 in a clockwide direction, the edge 36 of notched disc 26 which rotates therewith engages a lug 37 formed by pawl 23 as seen in FIG. 2 and urges stripper mechanism 6 in a clockwise direction against the bias of its spring 19. The pawl spring 24 is stronger than spring 19 so that the position of pawl 23 with respect to arm 13 is unchanged. The stripping mechanism 6 is carried in a clockwise direction by disc 26 until shoulder 17 strikes stop lever end 33, assuming it is properly positioned, thereby preventing any further clockwise movement of stripping mechanism 6. Continued rotation of drum 8 causes disc edge 36 to pivot pawl 23 in a counterclockwise direction with respect to arm 13 causing pawl lug 37 to ride on the periphery of disc 26 as best seen in FIG. 3. In this position, pawl lug 37 is underneath end 38 of locking lever 27 which prevents spring 19 from pulling stripping mechanism 6 back to its original position into engagement with stop 22. The stripper blade 7 which is now held stationary strips off the copy sheet from the matrix upon continued rotation of drum 8. After drum 8 has completed approximately three-fourths of its rotation, pawl lug 37 rides off of the periphery of disc 26 and pawl 23 is returned to its original position by its spring 24, releasing stripping mechanism 6 from locking lever 27. The spring 19 then returns stripping mechanism 6 to its original position into engagement with stop 22. The operation is then repeated for each copy sheet 34 until the operator notices that the copy sheet is just barely legible. The operator then moves stop lever 28 and arm 31 by handle 32 into a new position placing the stop lever end 33 in alignment with shoulder 18 which is further removed therefrom than shoulder 17. Consequently, drum 8 will have to rotate through a greater angle before stripping mechanism 6 is stopped by lever end 33 and locked in position by latch finger 38. Consequently, the copy sheets 34 being produced at this new setting will be maintained in engagement with matrix 9 for a longer time before being stripped off by stripping mechanism 6. Since the density of the subject matter being reproduced on the copy sheet is proportional to the contact time of copy sheet 34 with matrix 9, the operator will be able to produce additional copies of satisfactory density. It is obvious that the number and increments of adjustment allowed is not limited to two as illustrated by the two shoulders 17 and 18 but could be varied as desired.

The invention has been described in detail with particular reference to a preferred embodiment thereof, but it will be understood that variations and modifications can be effected within the spirit and scope of the invention as described herein above and as defined in the appended claims.

We claim:

1. In a copy sheet stripping mechanism for a copying device of the type in which a sheet is urged into intimate contact with a matrix and then stripped therefrom, the combination comprising: transport means for simultaneously advancing said matrix and sheet in superposed relation for a portion of a cycle of movement of said transport means; stop means; stripping means movable along with said transport means through said portion of a cycle from an inoperative position to an operative position into engagement with said stop means for stripping said sheet from said matrix upon continued movement of said transport means through said cycle; and interconnecting means between said transport and stripping means operable upon movement of said transport means to move said stripping means to said operative position.

2. The invention according to claim 1 wherein said stripping means is urged by a spring into said inoperative position, and said interconnecting means comprises a cam carried by said transport means and movable therewith, a pawl mounted on said stripping means and movable by said cam, said pawl carrying said stripping means therealong against the bias of said spring, and latch means cooperating with said pawl for releasably holding said stripping means in said operative position.

3. The invention according to claim 2 wherein said cam comprises a notched disk forming a shoulder adapted to engage said pawl.

4. The invention according to claim 2 wherein said pawl is pivotal.

5. The invention according to claim 1 wherein said stop means comprises a pivotal lever adapted to selectively engage stepped abutments formed by said stripping means.

6. The invention according to claim 2 wherein said latch means comprises a fixed finger engageable by a lug formed by said pawl.

7. The invention according to claim 1 wherein said stripping means has an abutment and is further urged by a first spring into said inoperative position, and said interconnecting means comprises a notched disk carried by said transport means and forming a shoulder, a pivotal pawl carried by said stripping means and movable by said shoulder, said pawl carrying said stripping means therealong, a second spring for urging said pawl into its first position, said stop means comprises a pivotal lever adapted to engage said abutment for stopping said stripping means in its operative position, said shoulder upon continued movement of said disk moving said pawl from a first position to a second position, said periphery of said disk engaging said pawl to releasably hold said pawl in said second position, and a fixed latch finger cooperating with said pawl in its second position for releasably holding said stripping means in said operative position against the bias of said first spring until said sheet is stripped from said matrix.

8. The invention according to claim 7 wherein said second spring is stronger than said first spring whereby said pawl and said stripping means are moved as a unit along with said transport means against the bias of said first spring until said abutment of said stripping means strikes said pivotal lever, said disk upon continued movement of said transport means urging said pawl into its second position and releasably holding it there.

9. The invention according to claim 1 wherein said stop means is adjustable for varying said operative position for stripping said sheet from said matrix at different points along said cycle of movement of said transport means.

10. In a copy sheet stripping mechanism for a copying device of the type in which a sheet is urged into intimate contact with a matrix and then stripped therefrom, the combination comprising: transport means including a rotatable drum for supporting said matrix and movable through a single revolution for simultaneously advancing said matrix and copy sheet in superposed relation for a portion of said revolution; stripping means adjacent said drum and movable from an inoperative position to an operative position for stripping said sheet from said matrix; cam means mounted on said drum for rotation therewith; a cam follower carried by said stripping means and movable by said cam means, said cam follower carrying said stripping means therealong; stop means for stopping said stripping means in said operative position; and latch means cooperating with said cam follower for releasably holding said stripping means in said operative position for stripping said sheet from said matrix as said drum completes its revolution.

11. The invention according to claim 1 wherein said operative position is adjustable for stripping said sheet from said matrix at different points along said cycle of movement of said transport means.

12. The invention according to claim 10 wherein said stripping means is urged by a spring into said inoperative position.

13. The invention according to claim 10 wherein said cam means comprises a notched disk forming a shoulder adapted to engage said cam follower.

14. The invention according to claim 10 wherein said cam follower is pivotal.

15. The invention according to claim 10 wherein said stop means comprises a pivotal lever adapted to selectively engage stepped abutments formed by said stripping means.

16. The invention according to claim 10 wherein said latch means comprises a fixed finger engageable by a lug formed by said pawl.

17. The invention according to claim 10 wherein said stripping means has an abutment and is urged by a first spring into said inoperative position, said cam means comprises a notched disk forming a shoulder, said cam follower comprises a pivotal pawl movable by said shoulder said pawl carrying said stripping means thereaong;

said stop means comprises a pivotal lever adapted to engage said abutment for stopping said stripping means in its operative position, said shoulder upon continued movement of said disk moving said pawl from a first position to a second position, said periphery of said disk engaging said pawl to releasably hold said pawl in said second position, a second spring for urging said pawl into its first position, and said latch means comprises a fixed finger cooperating with said pawl in its second position.

18. The invention according to claim 17 wherein said second spring is stronger than said first spring whereby said pawl and said stripping means are moved as a unit along with said transport means against the bias of said first spring until said abutment of said stripping means strikes said pivotal lever, said disk upon continued movement of said transport means urging said pawl into its second position and releasably holding it there until said sheet is stripped from said matrix.

References Cited in the file of this patent

UNITED STATES PATENTS

| | | |
|---|---|---|
| 1,951,757 | Jacobsen | Mar. 20, 1934 |
| 2,154,604 | Bradt | Apr. 18, 1939 |
| 2,758,539 | Ritzerfeld et al. | Aug. 14, 1956 |